(12) United States Patent
Sun et al.

(10) Patent No.: US 7,840,504 B2
(45) Date of Patent: Nov. 23, 2010

(54) LEARNING ENHANCED SIMULATED ANNEALING

(75) Inventors: Shaohua Sun, Jersey City, NJ (US);
Feng Zhuge, Mountain View, CA (US);
Sandy A. Napel, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 586 days.

(21) Appl. No.: 11/805,424

(22) Filed: May 22, 2007

(65) Prior Publication Data

US 2007/0299801 A1    Dec. 27, 2007

Related U.S. Application Data

(60) Provisional application No. 60/802,773, filed on May 22, 2006.

(51) Int. Cl.
*G06F 15/18* (2006.01)
(52) U.S. Cl. .............................. 706/12; 706/45; 706/46; 706/48; 706/59; 706/62
(58) Field of Classification Search ............. 706/12–15, 706/45, 46, 59–62
See application file for complete search history.

(56) References Cited

U.S. PATENT DOCUMENTS

| | | | | |
|---|---|---|---|---|
| 5,267,348 A | * | 11/1993 | Someya et al. | 706/52 |
| 5,745,735 A | * | 4/1998 | Cohn et al. | 703/6 |
| 5,761,381 A | * | 6/1998 | Arci et al. | 706/13 |
| 7,440,927 B2 | * | 10/2008 | Steels | 706/12 |
| 2005/0038762 A1 | * | 2/2005 | Grefenstette | 706/13 |
| 2005/0071301 A1 | * | 3/2005 | Kuroiwa | 706/12 |
| 2005/0268063 A1 | * | 12/2005 | Diao et al. | 711/170 |

* cited by examiner

*Primary Examiner*—Donald Sparks
*Assistant Examiner*—Omar F Fernandez Rivas
(74) *Attorney, Agent, or Firm*—Lumen Patent Firm

(57) ABSTRACT

A Learning Enhanced Simulated Annealing (LESA) method is provided. Based on a Simulated Annealing (SA) framework, this method adds a Knowledge Base (KB) initialized at the beginning of the search and updated at each iteration, which memorizes a portion of the search history and guides the further search through a KB trial generator. The basic idea of LESA is that its search history is stored in a KB, and a KB trial generator extracts information from it and uses it to generate a new trial. The next move of the search is the weighted sum of the trial generated by the KB trial generator and the trial generated by the usual SA trial generator. The knowledge base is then updated after each search iteration.

2 Claims, 1 Drawing Sheet

LEARNING ENHANCED SIMULATED ANNEALING

CROSS-REFERENCE TO RELATED APPLICATIONS

This application is cross-referenced to and claims priority from U.S. Provisional Application 60/802,773 filed May 22, 2006, which is hereby incorporated by reference.

FIELD OF THE INVENTION

The present invention relates generally to image processing. More particularly, the present invention relates to Learning Enhanced Simulated Annealing (LESA).

BACKGROUND OF THE INVENTION

Simulated Annealing (SA) is a popular global optimization method. Unfortunately, there are two difficulties are associated with SA. First, the search process is memory-less and therefore cannot avoid revisiting regions that are less likely to contain a global minimum. Second, the randomness in generating a new trial does not utilize the information gained during the search and therefore, the search cannot be guided to more promising regions. Accordingly, there is a need in the art to develop a global minimization method that overcomes these two difficulties.

SUMMARY OF THE INVENTION

The present invention provides a method referred to as Learning Enhanced Simulated Annealing (LESA). Based on a Simulated Annealing (SA) framework, this method adds a Knowledge Base (KB) initialized at the beginning of the search and updated at each iteration, which memorizes a portion of the search history and guides the further search through a KB trial generator. The basic idea of LESA is that its search history is stored in a KB, and a KB trial generator extracts information from it and uses it to generate a new trial. The next move of the search is the weighted sum of the trial generated by the KB trial generator and the trial generated by the usual SA trial generator. The knowledge base is then updated after each search iteration.

BRIEF DESCRIPTION OF THE FIGURES

The present invention together with its objectives and advantages will be understood by reading the following description in conjunction with the drawings, in which.

DETAILED DESCRIPTION OF THE INVENTION

Figure 1:
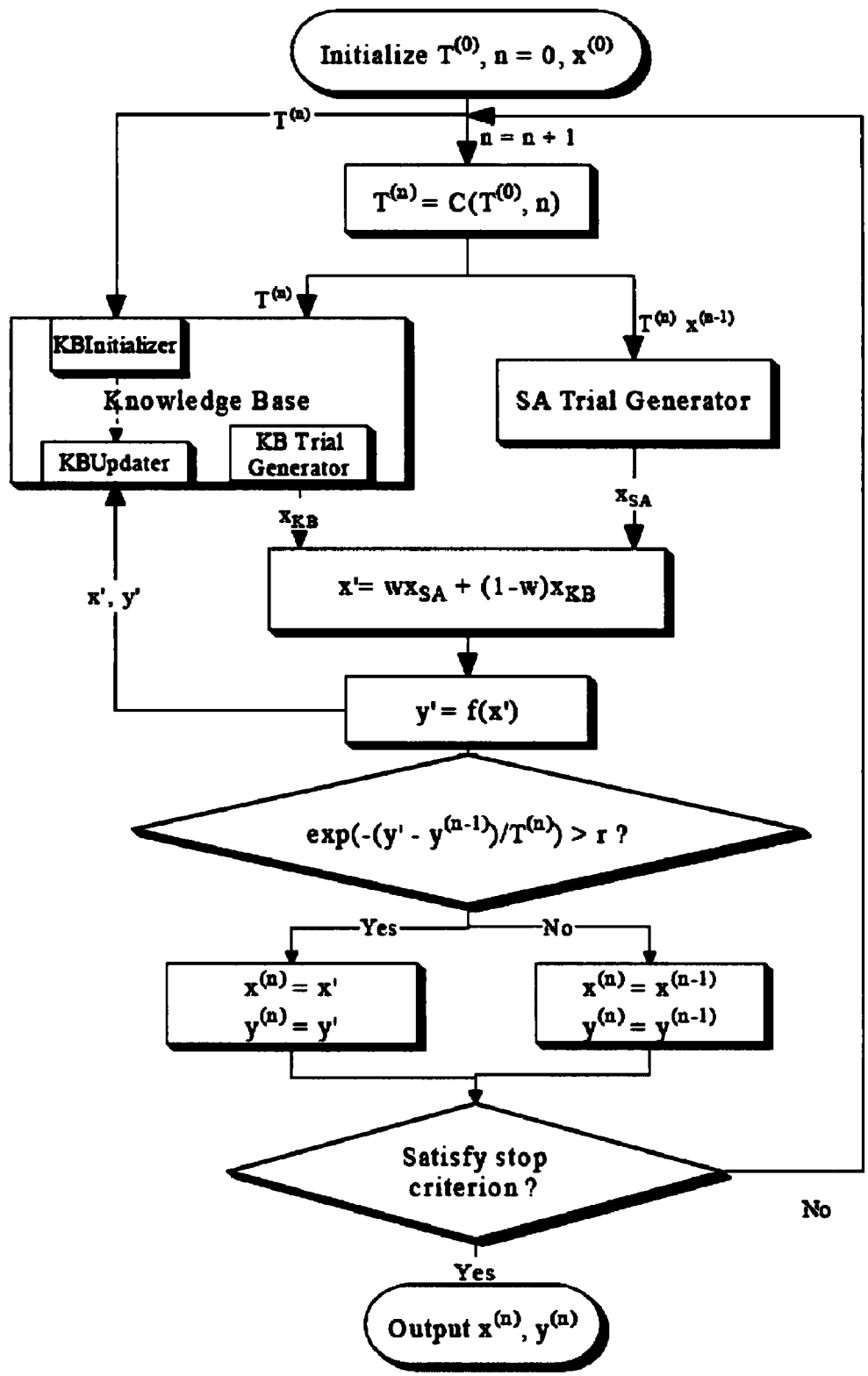
FIG. 1 shows according to the present invention a flowchart of the Learning-Enhanced Simulated Annealing (LESA) method. C(˙) represents cooling schedule, and r is a random number uniformly distributed on [0.1].

The basic idea of Learning-Enhanced Simulated Annealing (LESA) is that the search history of LESA is stored in a knowledge base, and a knowledge base trial generator extracts information from it and uses it to generate a new trial. The next move of the search is the weighted sum of the trial generated by the knowledge base trial generator and the trial generated by the usual Simulated Annealing trial generator. The knowledge base is updated after each search iteration. FIG. 1 gives the flowchart of the LESA algorithm. In the following paragraphs, we will discuss the LESA method in detail, which includes the data structure, the initialization, the trial generator, and the update of the knowledge base.

A. Knowledge Base Data Structure

The knowledge base is composed of two matrices: matrix U has dimension D X L, where D is the dimension of the search space and L is the number of samples stored in the search space; matrix V has dimension 1 X L, and $v_j$ corresponds to the function evaluation of the $j^{th}$ sample in the matrix U, which is the $j^{th}$ column of U.

B. Knowledge Base Initialization

In the KB initialization step, $l_0$ initial samples $x^{(j)}$, $j=0, 1, \ldots, l_0-1$, are taken from the search space, and the objective function f(x) is evaluated at these samples $y^{(j)}=f(x^{(j)})$, $j=0, 1, \ldots, l_0-1$. Each pair of $x^{(j)}$ and $y^{(j)}$ is input to the knowledge base, and the knowledge base is updated by a Knowledge Base Updater (KB Updater), which will be discussed infra.

C. Knowledge Base Trial Generator

The KB trial generator works in each dimension sequentially, i.e., it first generates $x'_0$, then $x'_1, \ldots$, then $x'_{D-1}$. In dimension i, at the current temperature $T^{(n)}$, the KB trial generator first sorts $U_i$, the coordinates of all the samples in the $i^{th}$ dimension, re-arranges the V correspondingly, maps the sorted V into a positive number, which takes higher values for lower V, and finally calculates a function $c_i(t)$, from which the new trial is generated. We discuss these steps one by one as follows.

First, $U_i$ is resorted in ascending order into $\tilde{U}$, and its function evaluation, V, is re-arranged correspondingly:

$$\tilde{U}=M_i U_i,$$

$$\tilde{V}=M_i V,$$

where $M_i$ is the permutation matrix that sorts $U_i$.

Note that if there are multiple $u^{(j)}$ i with the same value, there is only one item in the sorted $\tilde{U}$, and its $\tilde{v}$ is calculated as the mean of all the corresponding $v^{(j)}$'s. Next, each $\tilde{v}_j$ is mapped to a positive number $p^{(j)}$:

$$p^{(j)} = a^{(j)} \times \exp\left\{-\left(\frac{\sigma r^{(j)}}{T}\right)^2\right\}, j = 0, \cdots, \text{length}(KB) - 1,$$

$$| a^{(j)} = \max_j \tilde{v}^{(j)} - \tilde{v}^{(j)}, j = 0, \cdots, \text{length}(KB) - 1,$$

$$r^{(j)} = \frac{\text{No. of } \tilde{v}\text{'s that are less than } \tilde{v}^{(j)}}{\text{length}(KB) - 1}, j = 0, \cdots, \text{length}(KB) - 1,$$

where σ is a parameter.

Next, we calculate a function $c_i(t)$ based on the $p^{(j)}$'s. The function $c_i(t)$ has the property that it is steep where the $p^{(j)}$'s take large values.

$$c_i(t) = \sum_{j=1}^{\text{length}(KB)-1} b^{(j)}(t),$$

$$b^{(j)}(t) = \begin{cases} 0 & \text{when } t < \tilde{u}^{(j-1)}, \\ \tilde{c}^{(j)} + \frac{t - \tilde{u}^{(j-1)}}{\tilde{u}^{(j)} - \tilde{u}^{(j-1)}} * (\tilde{c}^{(j)} - \tilde{c}^{(j-1)}) & \text{when } \tilde{u}^{(j-1)} \le t < \tilde{u}^{(j)}, \\ 0 & \text{when } t \ge \tilde{u}^{(j)}, \end{cases}$$

-continued $$\tilde{c}^{(0)} = 0, \tilde{c}^{(j)} = \frac{\sum_{k=1}^{j} A(k)}{\sum_{k=1}^{length(KB)-1} A(k)}, \quad j = 1, \cdots, length(KB) - 1,$$

$$A^{(j)} = \frac{1}{2}(p^{(j)} + p^{(j-1)}) * (\tilde{u}^{(j)} - \tilde{u}^{(j-1)}), \, j = 1, \cdots, length(KB) - 1$$

We next calculate $X_{KBi}$ from $c_i(t)$ as follows: $x_{KBi}=c_i^{-1}(r)$, where r is a random number uniformly distributed on [0,1]. Since $c_i(t)$ is piece-wise linear, $x_{KBi}=c_i^{-1}(r)$ is implemented by linear interpolation between the smallest $c^{(j)}$ greater than r and the greatest $c^{(j)}$ less than r.

The pseudo code for KB Trial Generator is listed in Table I.

D. Knowledge Base Updater

The knowledge base is updated according to the following rule:

If the length of the knowledge base is less than a maximum length $l_{max}$, the new sample x and its function evaluation y is simply added to the knowledge base;

else find the nearest sample whose function evaluation is greater than y and replace it and its function evaluation with x and y.

EXAMPLES

In this section, we apply the LESA method to a suite of 9 test functions and to a clinical application that registers lung nodules in sequential CT scans. In all our experiments, the parameters were selected as: $T_0=1$, sigma=$1*10^{-5}$, $l_{max}=500$,

TABLE I

Pseudo Code for KB trial generator.

Input U, V, T
    For each dimension i, i = 1,..., D
        Sort $U_i$ and re-arrange $V_i$ correspondingly
1            $\hat{U} = M_i U_i$
2            $\hat{V} = M_i V$
        Map $\tilde{v}^{(j)}$ to a positive number $p^{(j)}$:

3            For the sorted $\hat{V}: p^{(j)} = a^{(j)} \times \exp\left(-\left(\frac{\sigma_T(j)}{T}\right)^2\right)$, 4            where: $r^{(j)} = \frac{\text{No. of } \tilde{v}s \text{ that are less than } \tilde{v}^{(j)}}{\text{length (KB)} - 1}$, 5            $a^{(j)} = \max_j \tilde{v}^{(j)} - \tilde{v}^{(j)}$, for $j = 0, \cdots$, length(KB) − 1.

Calculate $c_i(t)$:

6            $\tilde{c}^{(0)} = 0, \tilde{c}^{(j)} = A^{(j)} = \frac{1}{2}(p^{(j)} + p^{(j-1)})(\tilde{u}^{(j)} - \tilde{u}^{(j-1)})$, for $j = 1, \ldots$, length(KB) − 1

7            $\tilde{c}^{(j)} = \tilde{c}^{(j)} + \tilde{c}^{(j-1)}$, for $j = 1, \ldots$, length(KB) − 1

8            $\tilde{c}^{(j)} = \frac{\tilde{c}^{(j)}}{\tilde{c}(length(KB) - 1)}$, for $j = 0, \ldots$, length(KB) − 1

Calculate $x_{KB}$ based on cdf:
9        Generate a random number r in [0, 1]
10       $x_{KB} = \tilde{u}^{(a)} * \frac{\tilde{c}^{(a)} - r}{\tilde{c}^{(a)} - \tilde{c}^{(g)}} + \tilde{u}^{(g)} * \frac{r - \tilde{c}^{(g)}}{\tilde{c}^{(a)} - \tilde{c}^{(g)}}$, where s is the index of the smallest $\tilde{c}^{(j)}$ greater than r, and g is the index of the greatest $\tilde{c}^{(j)}$ less than r.

Output: $x_{KB}$

TABLE II

Pseudo Code for KB updater.

Input $x^{(j)}, y^{(j)}, U, V$
1    If length(KB) < $l_{max}$
2        $U = [U \, x^{(j)}], V = [V \, y^{(j)}]$
3    Else
4        Find the set $B = \{k | f(u^{(k)}) > f(x^{(j)})\}$
5        $r = \text{argmin}_{k \in B} \|u^{(k)} - x^{(j)}\|$
6        Replace $u^{(r)}$ with $x^{(j)}$, and $v^{(r)}$ with $y^{(j)}$
7    Output: U, V and ω=0.1. The initialization of the knowledge base, the stop criteria, and the selection of c will be discussed for each experiment.

Method

1) Optimization on Test Functions: We used the suite of test functions. We define the optimization error for these test functions as the difference between the minimum found by the optimization method and the true global minimum.

For the LESA method, for all the 9 test functions, the knowledge base was initialized by 100 random samples, i.e., $l_0=100$, from the search space, the stop criterion was that the optimization error was less than $10^{-12}$, and the algorithm was implemented for different c's, and for each c, the number of iterations required to achieve the desired optimization error was averaged over 10 runs. The maximum number of iterations was $10^5$, i.e., the search was terminated when the number of iterations exceeded $10^5$ even if the desired error had not been achieved.

We compared the LESA method to the traditional SA method over this test suite. The SA method was implemented using the same code as for the LESA by simply setting the SA weighting factor ω to 1. All the other parameters and the stop criterion were the same for the SA method.

To compare the SA and LESA methods, we applied the Wilcoxon paired test to the pairs of the minimum numbers of iterations, amongst the tested c's, required to achieve the error of $10^{-12}$ for the SA and the LESA method.

2) Lung Nodule Registration on Actual Patient Scans: We also applied the LESA method to a clinical application, the lung nodule registration problem. In this experiment, registration was done through a semi-rigid model, which first extracts the nodule structure and its 2 nearest neighboring structures in the source scan, and matches them to their correspondences in the target scan by maximizing a similarity metric. In the semi-rigid model, each of the 3 structures is allowed to undergo a rigid transformation specified by 6 parameters, 3 for translation and 3 for rotation. Maximizing similarity is equivalent to minimizing the negative of the similarity, therefore this is a 6*3-dimensional minimization problem.

The objective function is the similarity metric, which evaluates both the correlation between the source and target structures and the degree of elastic deformation, and which is a function of the transformation configuration and therefore is a function of vector x.

The dataset we used here contained 12 pairs of patient CT scans, each pair separated in time by 2 to 22 months (mean=7.7 months; s.d.=7.0 months). Patients were selected from those scanned to follow up nodules detected in a previous scan and all data were anonymized as required by HIPAA and our Institutional Review Board. Multi-detector CT scanning parameters were: 120 kVp, 222-440 mA, slice thickness and spacing 1-1.25 mm, reconstructed on a 512×512 matrix with in-plane pixel sizes of 0.6-1 mm. Two radiologists, each with over 10 years experience with pulmonary CT, determined all nodule locations in one scan and then matched each in the other. (One found and matched nodules in 5 pairs of scans and the other found and matched nodules in 7 pairs of scans.) The radiologists were asked to specify each nodule's coordinates by marking the position they perceived to be the nodule center. There were 5 nodules that were determined to have resolved and therefore were not visible in the second scan. For these, the radiologists estimated their locations in the second scan using anatomical cues, and lists of matched coordinates were stored in a computer file for use in our evaluation. Altogether, the radiologists detected 98 non-calcified nodules in the 12 source scans, and the manually determined size for them was 5.0 mm±2.7 mm (s.d.). Besides the 5 nodules that resolved in the second scans, the others were about the same size in both volumes. Registration time was evaluated on a per-nodule basis. The registration quality for each nodule was evaluated by the Distance Error (DE):

$$DE = \|(x_{r1}, x_{r2}, x_{r3}) - (x_{t1}, x_{t1}, x_{t1})\|$$

where $(x_{r1}, x_{r2}, x_{r3})$ denotes the identified coordinate of the registered nodule in the target scan, $(x_{t1}, x_{t1}, x_{t1})$ denotes the identified coordinate of the radiologist-determined location of the nodule in the target scan, and $\|\cdot\|$ denotes the Euclidian distance in mm.

For the LESA method in this experiment, the knowledge base was initialized by 15000 random samples from the search space. The search stopped when the temperature was lower than $1*10-12$. To allow a faster search, in the cooling schedule (2), D was set to be 1. The cooling schedule parameter c was picked by allowing 40000 iterations before approaching the lowest temperature.

B. Results

1) Optimization on Test Functions. Table III shows the number of iterations required, to achieve the desired error averaged over 10 runs for the 9 test functions for different c's. In this table, the numbers of iterations for the LESA method were increased by 100, corresponding to the 100 random samples in the initial knowledge base. If for some c, all of its 10 runs did not achieve the desired error within 105 iterations, the table shows a number in parentheses, instead of the mean number of iterations, corresponding to the number of runs that achieved the desired error within 105 iterations. This table shows that, for these 9 test functions, for the c's whose 10 runs reached the desired error consistently with the SA method, the mean number of iterations required to reach the desired error was comparable or less for the LESA method; for the c's whose 10 runs did not achieve the desired error consistently with the SA method, the LESA method had more runs (sometimes all the 10) achieve the error of $10^{-12}$.

TABLE III

Mean number of iterations for different c's for SA and LESA methods: test functions.

| | Function 1 | | | | | | |
|---|---|---|---|---|---|---|---|
| | c | | | | | | |
| | 0.8 | 0.9 | 1.0 | 1.1 | 1.2 | 1.3 | P-value[1] |
| SA | 1442.9 | 1180.6* | 1246.2 | 1367.1 | 1391.4 | 1507.7 | |
| LESA + 100 | 1338.9 | 1203.7 | 1118.9 | 1133.1 | 1039.3 | 920.4* | 0.13 |

TABLE III-continued

Mean number of iterations for different c's for SA and LESA methods: test functions.

Function 2

| | \multicolumn{6}{c}{c} | |
| --- | --- | --- | --- | --- | --- | --- | --- |
| | 0.6 | 0.7 | 0.8 | 0.9 | 1.0 | 1.1 | P-value |
| SA | 1912.7 | 1685.4 | 3878.3 | 1480.1 | 1173.3* | (9) | |
| LESA + 100 | 1667.9 | 1529.3 | 1237.5 | 1246.7 | 1115.2* | 1144.4 | 0.92 |

Function 3

| | c | | | | | | |
| --- | --- | --- | --- | --- | --- | --- | --- |
| | 1.6 | 1.7 | 1.8 | 1.9 | 2.0 | 2.1 | P-value |
| SA | (1) | (1) | (1) | (3) | (3) | (3) | |
| LESA + 100 | 10459.4 | 8117.6 | (9) | (8) | 7150.8 | (8) | N/A[2] |

Function 4

| | c | | | | | | |
| --- | --- | --- | --- | --- | --- | --- | --- |
| | 1.7 | 1.8 | 1.9 | 2.0 | 2.1 | 2.2 | P-value |
| SA | (1) | (0) | (0) | (0) | (2) | (3) | |
| LESA + 100 | 23442.2 | 19145.5 | 16097.5 | 14476.4 | 14264.9 | (9) | N/A |

Function 5

| | c | | | | | | |
| --- | --- | --- | --- | --- | --- | --- | --- |
| | 1.5 | 2 | 2.5 | 3 | 3.5 | 4 | P-value |
| SA | 5593.3 | 2512.4 | 1552.9 | 1957.7 | 1164.5* | 8760.1 | |
| LESA + 100 | 2428.9 | 1547.9 | 1275.1 | 911.7* | 943.9 | 1028.6 | 0.13 |

Function 6

| | c | | | | | | |
| --- | --- | --- | --- | --- | --- | --- | --- |
| | 4 | 4.2 | 4.4 | 4.6 | 4.8 | 5 | P-value |
| SA | (7) | (7) | (7) | (7) | (6) | (5) | |
| LESA + 100 | (9) | 18972 | 19096 | (9) | 12962 | 12101 | N/A |

Function 7

| | c | | | | | | |
| --- | --- | --- | --- | --- | --- | --- | --- |
| | 3.3 | 3.4 | 3.5 | 3.6 | 3.7 | 3.8 | P-value |
| SA | 1321.4 | 1331.1 | 1220.1* | 1295.1 | 1376.7 | 1387.2 | |
| LESA + 100 | 1014.1 | 1070.4 | 1061.9 | 994.1 | 935.6* | 1097.4 | $9.8 * 10^{-3}$ |

Function 8

| | c | | | | | | |
| --- | --- | --- | --- | --- | --- | --- | --- |
| | 0.24 | 0.26 | 0.28 | 0.30 | 0.32 | 0.34 | P-value |
| SA | (9) | 10027.60 | 9405.7* | (9) | (9) | (8) | |
| LESA + 100 | 5816.8 | 5086.6 | 4605.5 | 4077.6 | 3611.3 | 3351.4* | $1.9 * 10^{-3}$ |

Function 9

| | c | | | | | | |
| --- | --- | --- | --- | --- | --- | --- | --- |
| | 3 | 4 | 5 | 6 | 7 | 8 | P-value |
| SA | 54775.8 | 16135.3 | 7125.3 | 4564.8 | 3484.1 | 3240.2* | |
| LESA + 100 | 15658.8 | 6658.3 | 4046.3 | 3008.1 | 2578 | 2023.2* | $1.9 * 10^{-3}$ |

We can also see from Table III that, amongst the 9 test functions, the SA method, for all c's tested, failed to find the true global minimum consistently for function 3, function 4, and function 6, while the LESA method did for 3 out of 6, 5 out of 6, and 4 out of 6 c's tested, respectively, which shows the LESA method improves the probability of converging to the true global minimum greatly compared to the SA method for these functions. The p-values of the Wilcoxon paired test applied to the pairs of minimum mean numbers of iterations, listed in Table III, show that, including the computational cost of initializing the knowledge base, the mean number of iterations required to converge to the true global minimum is not significantly different for the LESA method compared to the SA method for functions 1,2, and 5, while significantly different for functions 7,8, and 9.

From the above results, we can say that for this 9-function test suite, LESA shows better performance compared to the standard SA method.

2) Nodule Registration on Actual Patient Scans: The registration results for SA, two-layered SA, and LESA methods, are listed in Table IV. All methods converged to target locations for all 98 nodules in the source scans. The SA methods with 400,000 and 800,000 iterations achieved mean distance errors of about 20 mm per nodule. The two-layered SA method with 650,000 iterations achieved a mean registration distance error of 1.5 mm and a mean registration time of 622.7 s. per nodule. The LESA method with 40,000 iterations achieved a mean registration distance error of 1.3 mm, but with a mean registration time of 70.0 s. per nodule. Table IV shows that the LESA method is more accurate than the standard SA method, and is much faster than either method.

TABLE IV

Results for the lung nodule registration experiment on actual patient scans.

| Method | Distance error (mm): mean ± s.d. (worst case) | Registration time (s.) mean ± s.d. (worst case) |
|---|---|---|
| SA with 400,000 iterations | 20.2 ± 10.0 (40.7) | 359.7 ± 163.7 (1254.2) |
| SA with 800,000 iterations | 20.8 ± 9.1 (37.7) | 710.0 ± 313.4 (2451.4) |
| Two-layered SA with 650,000 iterations | 1.5 ± 0.9 (6.6) | 622.7 ± 282.1 (1855.6) |
| LESA with 40,000 iterations | 1.3 ± 0.8 (4.9) | 70.0 ± 22.4 (186.9) |

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, the invention can be implemented as a set of instructions or routines, which can be computer-implemented, stored on a computer readable medium and/or accessible or readable by a computer. All such variations are considered to be within the scope and spirit of the present invention as defined by the following claims and their legal equivalents.

What is claimed is:

1. A learning enhanced simulated annealing method, comprising:
    (a) generating a search trial from a simulated annealing generator;
    (b) generating a search trial from a knowledge base generator taking into account historic search results generated by said simulated annealing generator and historic information stored in a knowledge base, wherein said stored historic information in said knowledge base contains prior results of combinations of the search trial from the similated annealing generator and the search trial from the knowledge based generator, whereby said historic information is used to generate a probability function for the generation of said search trial of said knowledge base generator;
    (c) generating a combined learning enhanced search trial by combining the generated search trial from said simulated annealing generator with the generated search trial from said knowledge base generator;
    (d) analyzing said combined learning enhanced search trial;
    (e) updating said knowledge base with the results of said analyzed combined learning enhanced search trial; and
    (f) iterating steps (a) through (e) until a satisfactory criterion has been reached.

2. A program storage device having a computer readable medium accessible by a computer, tangible embodying a program of instructions or routines on said computer readable medium and executable by said computer to perform enhanced simulated annealing method steps, comprising:
    (a) generating a search trial from a simulated annealing generator;
    (b) generating a search trial from a knowledge base generator taking into account historic search results generated by said simulated annealing generator and historic information stored in a knowledge base, wherein said stored historic information in said knowledge base contains prior results of combinations of the search trial from the similated annealing generator and the search trial from the knowledge based generator, whereby said historic information is used to generate a probability function for the generation of said search trial of said knowledge base generator;
    (c) generating a combined learning enhanced search trial by combining the generated search trial from said simulated annealing generator with the generated search trial from said knowledge base generator;
    (d) analyzing said combined learning enhanced search trial;
    (e) updating said knowledge base with the results of said analyzed combined learning enhanced search trial; and
    (f) iterating steps (a) through (e) until a satisfactory criterion has been reached.

* * * * *